United States Patent [19]

Sweeney

[11] Patent Number: 4,850,749

[45] Date of Patent: Jul. 25, 1989

[54] AIRLOCK HAVING FLAPS IN CONTINUOUS FEED OF MATERIAL CARRIED BY A GAS STREAM WHILE OBSTRUCTING FREE FLOW OF GAS

[75] Inventor: William R. Sweeney, Richmond, Va.

[73] Assignee: Philip Morris Incorporated, New York, N.Y.

[21] Appl. No.: 135,145

[22] Filed: Dec. 18, 1987

[51] Int. Cl.⁴ .............................................. B65G 53/08
[52] U.S. Cl. ........................................ 406/62; 131/84.3;
131/109.1; 198/604; 198/607; 198/690.2;
414/217; 406/78
[58] Field of Search .................. 406/62, 63, 64, 67,
406/72, 74, 80, 81, 82, 51, 52, 65, 68, 77, 79;
131/109.1, 84.3, 287; 414/217, 221; 198/607,
604, 626, 698, 690.2, 689.1, 428, 438, 494

[56] References Cited

U.S. PATENT DOCUMENTS

| | | | |
|---|---|---|---|
| 540,155 | 5/1895 | Dula et al. | 406/81 X |
| 1,571,537 | 2/1926 | Berold | 131/315 |
| 1,675,090 | 6/1928 | Burns et al. | 131/315 |
| 2,003,141 | 5/1935 | Dorfan | 209/150 |
| 2,163,833 | 6/1939 | Eissmann | 131/312 |
| 2,173,087 | 9/1939 | Eissmann | 131/312 |
| 2,173,088 | 9/1939 | Eissmann | 131/312 X |
| 2,643,768 | 6/1953 | Eissmann | 209/135 |
| 2,667,174 | 1/1954 | Eissmann | 131/312 |
| 2,701,570 | 2/1955 | Eissmann | 131/312 |
| 2,851,146 | 9/1958 | Sherrill | 198/438 X |
| 2,988,213 | 6/1961 | Davis et al. | 209/21 |
| 3,043,315 | 7/1962 | Verhappen | 131/312 |
| 3,046,998 | 7/1962 | Mortimer | 131/312 |
| 3,091,244 | 5/1963 | Molins et al. | 131/84.3 |
| 3,116,238 | 12/1963 | Van Etten | 209/250 |
| 3,237,753 | 3/1966 | Allen et al. | 198/689.1 OR |
| 3,360,125 | 12/1967 | Horsey | 209/12 |
| 3,362,414 | 1/1968 | Wochnowski | 131/312 |
| 3,367,342 | 2/1968 | Lewis | 131/311 |
| 3,386,773 | 6/1968 | Ballard, Jr. | 406/16 X |
| 3,409,025 | 11/1968 | Wochnowski | 131/303 X |
| 3,450,311 | 6/1969 | Bonneric | 198/524 X |
| 3,460,869 | 8/1969 | Herr | 406/60 |
| 3,513,858 | 5/1970 | Pietrucci | 131/312 |
| 3,514,159 | 5/1970 | Labbe | 406/28 |
| 3,608,716 | 9/1971 | Rowell et al. | 209/139.1 |
| 3,655,043 | 4/1972 | Wochnowski | 209/138 |
| 3,665,932 | 5/1972 | Goldbach | 131/280 |
| 3,826,065 | 7/1974 | Labbe | 131/110 X |
| 3,881,590 | 5/1975 | Hartmann | 198/626 |
| 3,989,309 | 11/1976 | Preston | 406/70 |
| 3,991,772 | 11/1976 | Smith, Jr. | 131/138 |
| 4,009,912 | 3/1977 | Mraz | 406/144 |
| 4,024,878 | 5/1977 | Labbe | 131/84 B |
| 4,135,615 | 1/1979 | Brackmann et al. | 198/371 |
| 4,166,027 | 8/1979 | Smith | 209/139 |
| 4,223,685 | 9/1980 | Labbe | 131/109 |
| 4,259,032 | 3/1981 | Kuhner | 406/62 |
| 4,264,238 | 4/1981 | Leckband et al. | 406/62 |
| 4,286,910 | 9/1981 | Conrad | 414/221 |
| 4,308,876 | 1/1982 | Rothchild | 131/293 |
| 4,408,619 | 10/1983 | Perkins | 131/108 |
| 4,446,876 | 5/1984 | Brackman | 131/110 |
| 4,474,511 | 10/1984 | Labbe | 406/70 |
| 4,475,562 | 10/1984 | Thatcher et al. | 131/110 |
| 4,507,876 | 4/1985 | Conrad | 34/242 |
| 4,557,278 | 12/1985 | Brackmann et al. | 131/109.1 |

FOREIGN PATENT DOCUMENTS

| | | |
|---|---|---|
| 490237 | 1/1930 | Fed. Rep. of Germany . |
| 548111 | 4/1932 | Fed. Rep. of Germany . |
| 591577 | 4/1934 | Fed. Rep. of Germany . |
| US79/00705 | 9/1979 | PCT Int'l Appl. . |
| 206350 | 11/1923 | United Kingdom . |

Primary Examiner—Joseph F. Peters, Jr.
Assistant Examiner—Gregory R. Poindexter
Attorney, Agent, or Firm—Jeffrey H. Ingerman

[57] ABSTRACT

An airlock for the continuously feeding through of a material while obstructing the free flow of a gas is provided. The airlock comprises a first continuous belt having a plurality of nonporous flaps projecting out from it. Each flap has a free edge located outwardly from the belt. A second belt runs parallel to the first and has elements to seal against the free edges of the flaps of the first belt. A motor moves the belts so that their transport sides move together. Particulates are transported in the chambers formed by belts and flaps while the flow of air between and past the belts is inhibited.

10 Claims, 6 Drawing Sheets

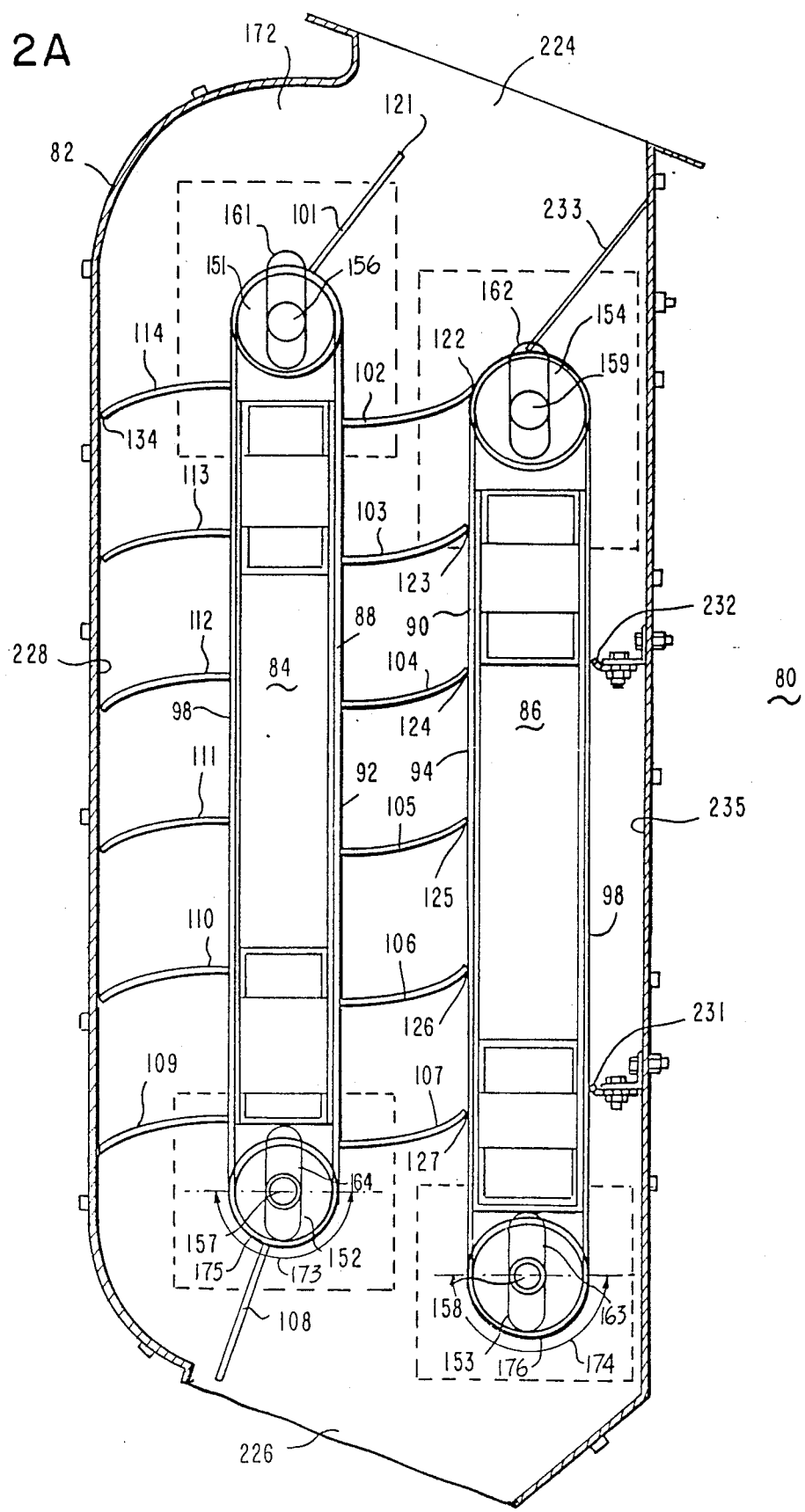

4,850,749

AIRLOCK HAVING FLAPS IN CONTINUOUS FEED OF MATERIAL CARRIED BY A GAS STREAM WHILE OBSTRUCTING FREE FLOW OF GAS

BACKGROUND OF THE INVENTION

1. Field of Invention

The present invention relates to an airlock used to continuously feed a material through the airlock while obstructing the free flow of a gas. It particularly relates to such an airlock for use in delivering tobacco or other friable material.

2. Prior Art

In the production of tobacco products, flowing air is often used to transport and/or classify particles of tobacco. Such air is generally driven by an induced pressure differential along the flow path.

At the terminus of such a transport or classification process, it is often desired to separate the pressurized airflow from the tobacco particles. Such separation is generally accomplished today by a rotary airlock. Such an airlock is shown in FIG. 1 and comprises a funnel-shaped feed inlet, a housing having therein a chamber in the shape of a horizontal cylinder, a vaned rotor which coaxially rotates within the cylindrical chamber, and an outlet at the bottom of the chamber. Examples of similar airlocks are referred to in U.S. Pat. Nos. 2,643,768; 2,988,213; 3,043,315; 3,046,998; 3,116,238; 3,362,414; 3,608,716; 3,665,932; 4,166,027; 4,259,032; 4,308,876; and 4,446,876.

There are problems with such rotary airlocks, primarily an undesired degree of breakage of tobacco strands, and secondarily a high degree of abrasive wear to the airlock itself. As each vane sweeps up from the return wall of the cylinder into the tobacco piled in the intake funnel, the vane begins a shearing action between the pushed and pulled portions of the tobacco strands. This shearing action breaks strands.

As the vane edge strikes the transport wall of the chamber, it creates a high-shear point which may cause further strand breakage or which may jam the rotor. As the vane edge sweeps the transport wall there is a grinding action between edge and wall which further damages tobacco and additionally wears both wall and edge, particularly when sand is present. Interaction between driven and falling tobacco, at the discharge, shears and breaks more tobacco.

Some other patents refer to the use of single endless belts in airlocks.

U.S. Pat. No. 540,155, to Dula et al., refers to an endless belt provided with cross pieces which conducts leaves from a box and discharges them into a pneumatic conveyor. The discharge of air past the endless belt is prevented by a close fit between the cross strips and one rounded end of the box and on the other end is prevented by flexible strips lapping on the cross pieces. This single belt system involves relative motion between the stationary flexible strips and the moving leaves.

U.S. Pat. No. 3,091,244, to Molins et al. refers to an air-pervious conveyor, the end of which may be closed by a tyre or a plurality of paddle elements on a rotatable wheel. In this arrangement the contact point between conveyor and closure means exists only at the point where the wheel element contacts the conveyor.

U.S. Pat. No. 3,514,159 to Labbe refers to an endless band forming one wall of a channel. Tobacco moving through the channel forms an airlock. There is relative motion between the non-moving walls of the channel and the tobacco confined thereby.

SUMMARY OF INVENTION

The present invention is an airlock which has a pair continuous belts. A transport portion of a first belt is in spaced parallel relationship with a transport portion of the surface of a second belt. One of the belts comprises a plurality of non-porous flexible cleats or flaps projecting from its surface. One end of each flap is mounted perpendicularly on its belt and the opposite end is a free edge. The free edge sealingly engages a sealing means, such as a soft surface, on the other belt. The flap and sealing means move together to transport particulates such as tobacco fibers. There is no grinding action between the flap edge and the sealing means, since both move together. The lack of grinding helps reduce tobacco breakage.

In the preferred embodiment, one belt has the flaps which seal against the surface of the other belt forming chambers between the flaps and belts. Fingers protrude from the edges of one belt to complete the enclosure. Both belts are driven at the same speed and together they transport tobacco in the chambers thus formed.

Since the tobacco is completely enclosed in the moving chamber, there is negligible frictional degradation during transport therein.

The height of each flap above its belt should be greater than the diameter of the belt rollers. The small diameter roller causes the flaps of the belt to rotate quickly through the intake area, sweeping little tobacco with its edge. Thus, very little tobacco is pinched against the sealing means of the other belt.

Another advantage of the small diameter rollers is that at the bottom of the airlock the flap opens quickly, dropping the tobacco all at once with little rolling action or shearing Thus, breakage is further avoided This dropping of the tobacco occurs around a nadir or bottom of each belt. This nadir is within an arc formed by the bottom roller. The tobacco is thus given the longest possible opportunity to fall from the belt, as the outside surface of the belt is stretched around the curve of the roller on both sides of the nadir.

The fact that the nadir is a single point on the small diameter arc localizes the dispersion of the tobacco that drops from the belts.

The lateral edges of the belts are sealed by a thin membrane of polyethylene or other tough, pliable polymer. This membrane is pushed against the belts and fingers by a slight air pressure. The stationary sealing membrane does not come into contact with the moving tobacco because of the interleaved fingers at the lateral edges of one belt between the membrane and the tobacco.

The present invention can have sufficient capacity to receive tobacco in free fall rather than by shearing a vane through a pile of tobacco. Thus, the present invention has the advantage of shearing and breaking less tobacco.

Capacity can be increased by increasing speed or belt width, while pressure differential isolating capacity can be increased by increasing belt length and the number of flaps.

The present invention's larger number of flaps smooths the delivery rate and reduces the uneven surge of tobacco when compared to a four-vaned conventional rotary airlock.

BRIEF DESCRIPTIONS OF THE DRAWINGS

FIG. 2A is a front elevation in section of the present invention.

DETAILED DESCRIPTION

Prior Art

Figure 1:
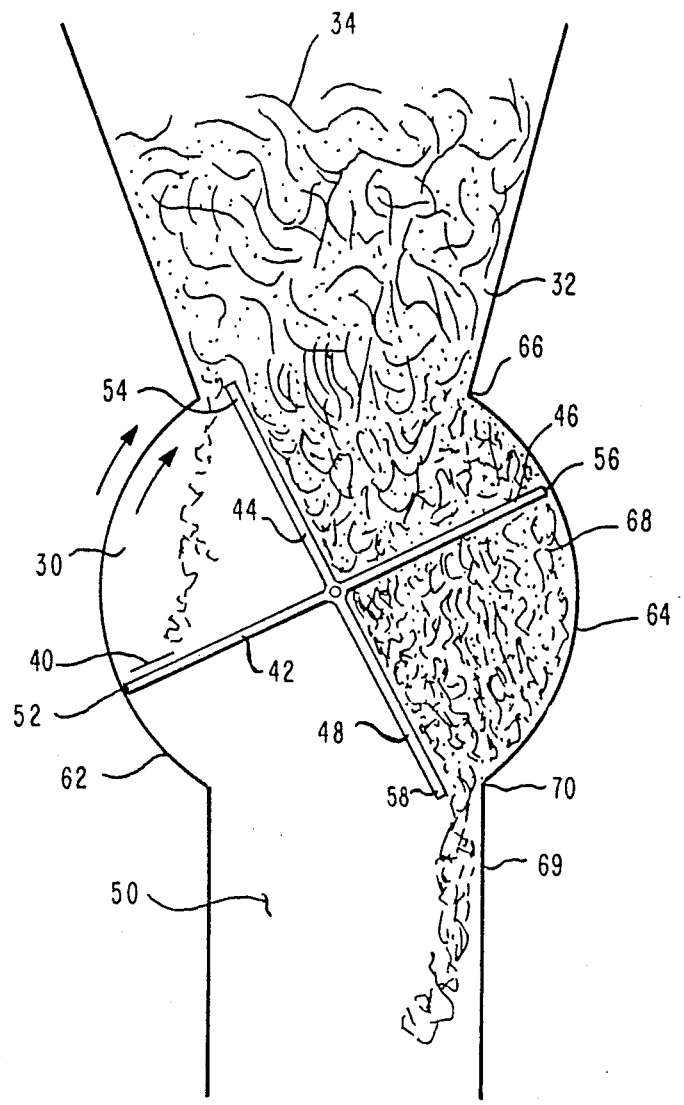
FIG. 1 is an elevation in section of a conventional airlock.

FIG. 1 shows an airlock of the prior art. It comprises a cylindrical chamber 30 having a funnel-shaped feed inlet 32 in which tobacco 34 is deposited. Rotor 40, comprising vanes 42, 44, 46, 48, is disposed coaxially within cylindrical chamber 30. Outlet 50 opens from the chamber bottom. At the depicted rotor orientation, vanes 42, 46 seal against the chamber walls and obstruct airflow while vanes 44, 46 drive tobacco clockwise through the airlock. There is friction between the tips 52, 56 of vanes 42, 46 and return wall 62 and transport wall 64. The tobacco is subjected to high shear forces at tip 54 of vane 44 where the tip is driven through the pile of tobacco 34. High shear forces also exist at corner 66, particularly when any vane tips 52, 54, 56, 58 sweep past corner 66. Grinding occurs especially by sand between tips 52, 56 and walls 62, 64. Tobacco 68 interacts frictionally with transport wall 64. As tobacco strands 69 roll off wall 64 at corner 70 strands are broken by pulling between falling strands 69 and the strands still supported by wall 64 and vane 48.

Preferred Embodiment

Figure 2:
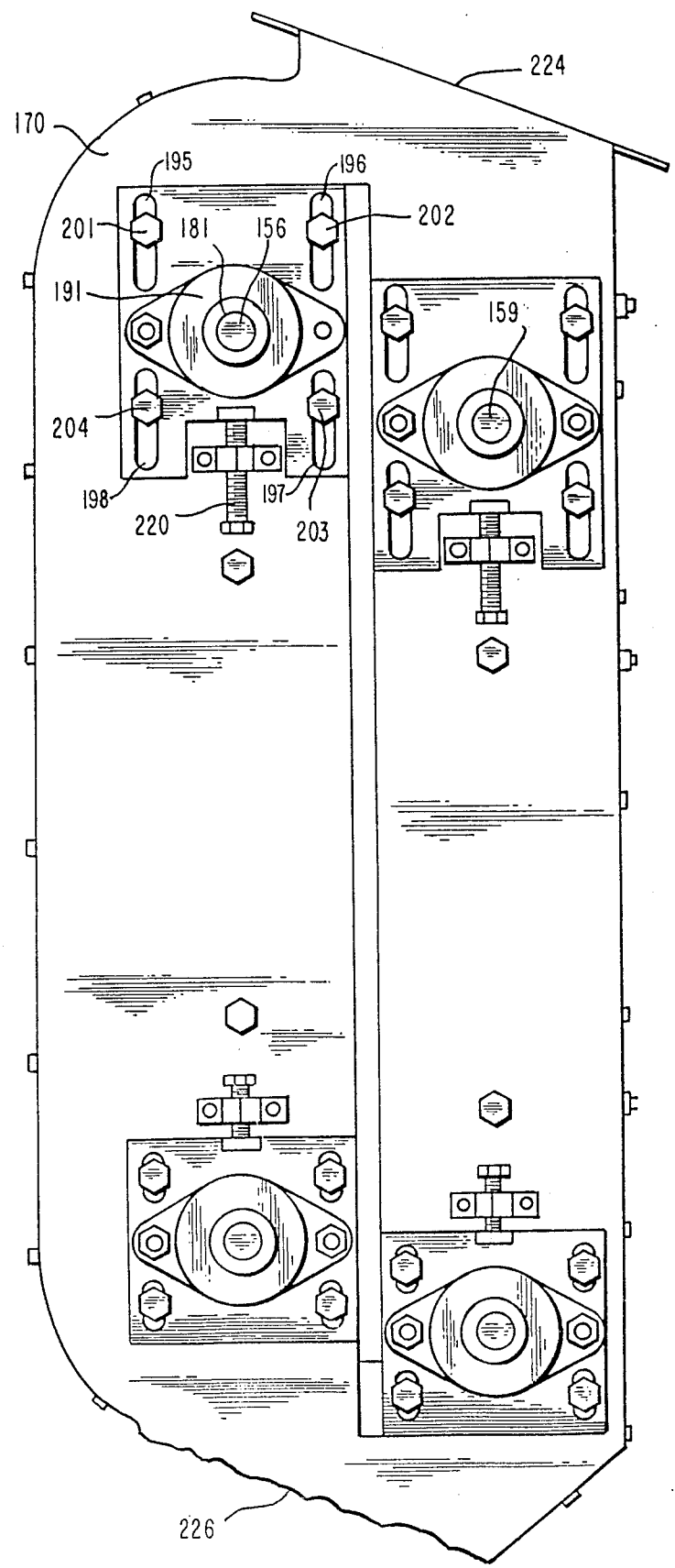
FIG. 2 is a front elevation of the present invention.

A preferred embodiment of the airlock, generally designated 80, of the present invention is shown in FIG. 2. As shown in FIG. 2A, it comprises a housing 82 containing a pair of revolving members 84, 86. Preferably, both members comprise continuous moving belts 88, 90. The zones of belts 88, 90 which face each other shall be referred to herein as transport zones or surfaces 92, 94. The opposite zones will be called return zones 96, 98. The transport zone surface 92, 94 of each belt is in spaced parallel relationship to that of the other belt.

Projecting from one of the belts 88 is a plurality of non-porous flap means such as flaps 101-114.

Each flap has a free edge 121-134 disposed outwardly or distally from the surface on which it is mounted. Each such free distal edge is capable of engaging a sealing means on the other belt 90. In the present embodiment, the sealing means comprises surface 94 of belt 90. At least one, but preferably both belts 88, 90 are driven by a drive means such as motor 136 represented in FIG. 3.

Figure 3:
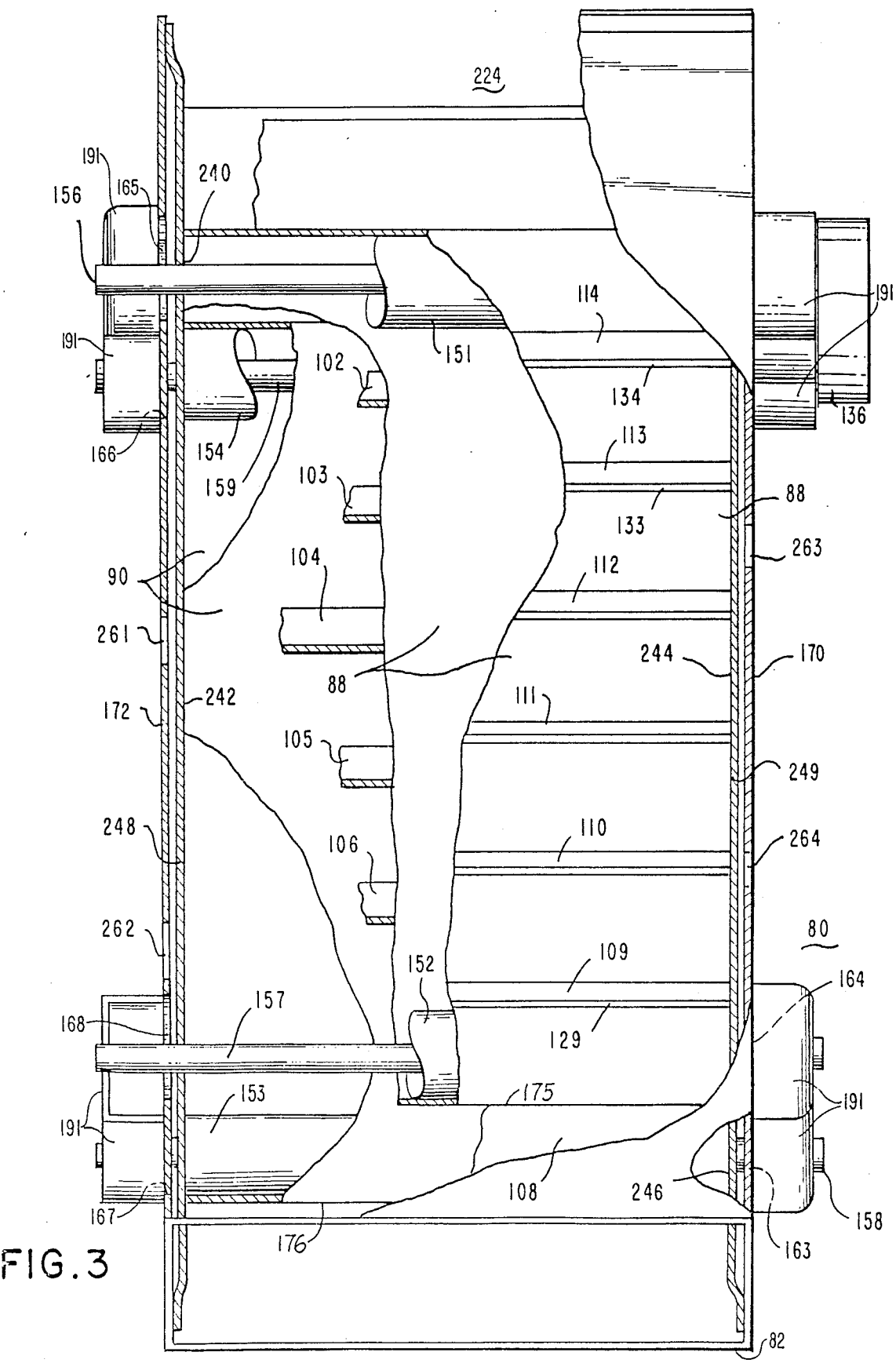
FIG. 3 is a left side elevation in several partial sections of the present invention.

Belts 88, 90 (FIGS. 2-3) are borne on small diameter (about 2") rollers 151-154. These belts are suitably constructed of polyester, rubber impregnated fabric, rubber or foamed rubber (closed cell) based on a copolymer of monomers comprising ethylene and propylene, (closed cell), any combination of the above, or other suitable non-porous materials. Each roller has a shaft 156-159 projecting through an elongated slot 161-164 (FIG. 2A) on front wall 170 (FIG. 3) and through another elongated slot 165-168 on back wall 172 (FIG. 3) of housing 82. As in FIG. 2, shaft 156 is borne by bearing 181, in bearing mount 191. Each bearing mount 191 comprises four elongated slots 195-198 through which it is bolted to its housing wall 170 (FIG. 2), 172 (FIG. 3). In order to adjust belt tension (FIG. 2), bolts 201-204 are loosened slightly and adjustment screw 220 is tightened or loosened as needed. Such bearing mounts 191 are provided at both ends of all four shafts 156-159, for a total of eight adjustable bearing mounts 191 (FIG. 3).

Drive means, such as motor 136 (FIG. 3), drives shafts 156, 159, rollers 151, 154 and both belts 88, 90 at substantially the same surface speed, so that transport surfaces 92, 94 (FIG. 2A) have substantially the same velocity.

In operation, belt 88, revolving clockwise, rotates its flap 101 around roller 151 as freely falling tobacco falls upon flaps 101, 102 from the low pressure airflow zone at intake 224. Flap 102 is shown in a position in which it will carry a charge of tobacco and in which its edge 122 forms a somewhat airtight seal against belt surface 94.

Thus flaps 102-107, belts 88, 90 and walls 170, 172 form a series of chambers, each transporting a charge of tobacco towards discharge 226. Although a single flap might be inadequate to seal off a high pressure differential from leaking across it, the plurality of flaps 102-107 provides a series of low pressure differential isolation chambers which collectively are able to isolate a pressure differential equal to the sum of the pressure capacity of all the individual chambers. In order to isolate higher differential pressures, one need only make the substantial parts of the belt surfaces that are in spaced parallel relationship longer and with more flaps. The area of the belt surfaces which are in spaced parallel relationship is dictated by the volume and number of chambers desired to be transporting tobacco at any given moment. These, in turn, are functions of pressure differential, designed capacity, belt width, flap area, belt speed, sealing ability of each individual chamber, and possibly other factors such as cost or available space.

In the presently preferred embodiment, pressure differentials from one inch up to about 20 inches of water are accommodated, moving about two-thirds of a cubic foot of material per minute—about 10 to 15 pounds per minute of tobacco. Flap height is about 4 to no more than 6 inches. Belt speed is 10 to 20 feet per minute. Belt width is 2 feet. Spacing between flaps is about 6 inches. Belt length is dictated by pressure drop and by space limitations, and is presently less then 3 feet from roller to roller.

As flap 108 rotates around relatively small diameter roller 152 it swings rapidly clear of its tobacco charge which charge goes into free fall with little rolling or shear. The diameter of each roller 151, 152 should be less than the height of each flap from the surface of its belt. The arcs 173, 174 formed by belts 88-90 extend 90° to either side of nadirs 175, 176.

As flaps 109-114 return towards roller 151 they seal against a return flap sealing means which is wall 228 and form another series of pressure-isolating chambers blocking airflow on the return side of the rotating member 84.

Airflow is sealed off on the return zone of belt 90 by a return sealing means comprising a plurality of flexible flaps 231-233 mounted on wall 235.

As shown in FIG. 3 airflow past back lateral edges 240, 242, and front lateral edges 244, 246 of belts 88, 90 and past the back and front lateral edges of the flaps is blocked by a lateral sealing means associated therewith. Such lateral sealing means preferably comprises a back membrane 248 associated with lateral edges 240, 242 and a front membrane 249 associated with lateral edges 244, 246 of belts 88, 90 and flaps 101-114. Each membrane is in fluid communication on its outside with the higher of the two ambient pressures, on either the intake or discharge of the airlock. The membranes are preferably constructed of a tough pliable polymer such as polyethylene.

Thus, in the more usual use of the airlock, with the intake 224 (FIG. 3) air being of lower than atmospheric pressure, the outside of the membranes may be left open to the ambient atmosphere, as by vents 261-264 through walls 170-172. The pressure differential between the atmosphere and the intake air will press the membrane into sealing contact with the lateral edges of the belts and flaps. Where pressure differentials across the edges are high, sealing force will also be relatively high, and where pressure differentials are low, sealing forces will be less. Therefore, the pressure differential across the membrane will vary as needed for sealing in a way that minimizes the forces of drag and wear between membrane and edges. Membranes 248, 249 are designed to be easily replaced, and, by their nature, they self-adjust their positions to compensate for edge wear.

As described above, the airlock of the present invention is more gentle than existing airlocks, but there is still some friction between membranes 248, 249 and the tobacco passing along such membranes.

Figures 4, 5:
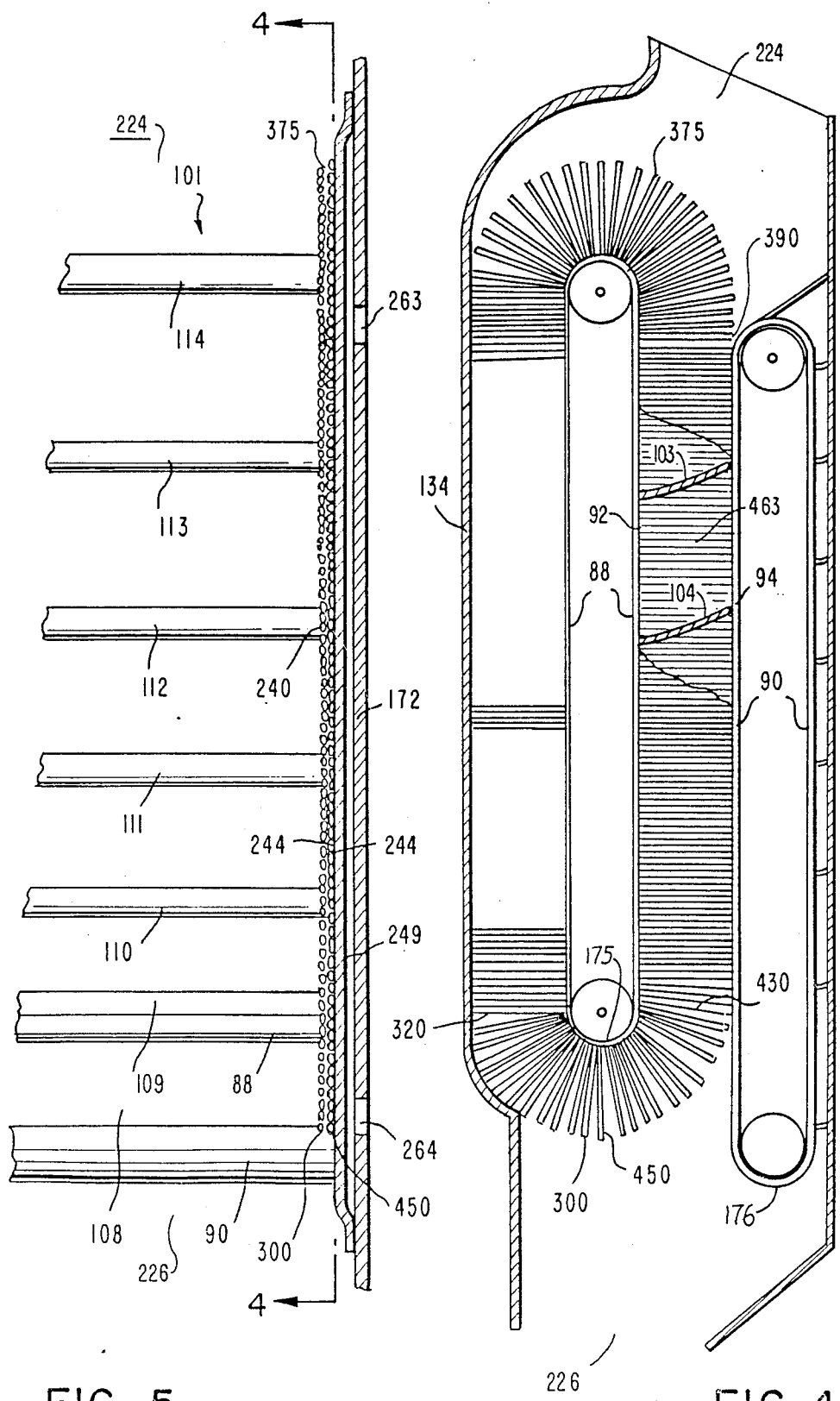
FIG. 4 is an elevation of an embodiment of the present invention sectioned along a plane indicated in FIG. 5 and partially sectioned slightly back of that plane.
FIG. 5 is a left side elevation of the same embodiment as FIG. 4 viewed without the facing sidewall and in partial section.

FIG. 4 shows a further refinement which substantially eliminates any relative motion between the tobacco and the surfaces in contact with the tobacco.

A plurality of elongated cylindrical flexible fingers 300-450 protrude out from and at substantially right angles to the surface of belt 88. They project from the edges of belt 88 in one or more rows, preferably two or three parallel staggered rows in close contact with each other as in FIG. 5. As fingers 390-430 project from transport surface 92 of belt 88, their soft sides abut each other and form an effective sidewall at both the back lateral edge 240 (FIG. 3) and front lateral edge 244 (FIGS. 3 & 5) of belt 88. The distal end of each of these transport side fingers 390-430 (FIG. 4) is stiffened by its frictional contact with transport surface 94. Thus the fingers cooperate with the transport side flaps 102-107 (FIGS. 2A-3) and belt surfaces 92-94 (FIG. 4) to form a plurality of fully enclosed transport chambers such as 463 (FIG. 4). The tobacco in these chambers remains unmoving, relative to all the inside surfaces of the chambers, as it is transported from intake 224 to discharge 226 without grinding or abrasion. As fingers 430-450, 300-320 (FIG. 4) round roller 153, their distal ends spread fan-fashion to discharge any shreds that may have been trapped between the fingers.

Figure 6:
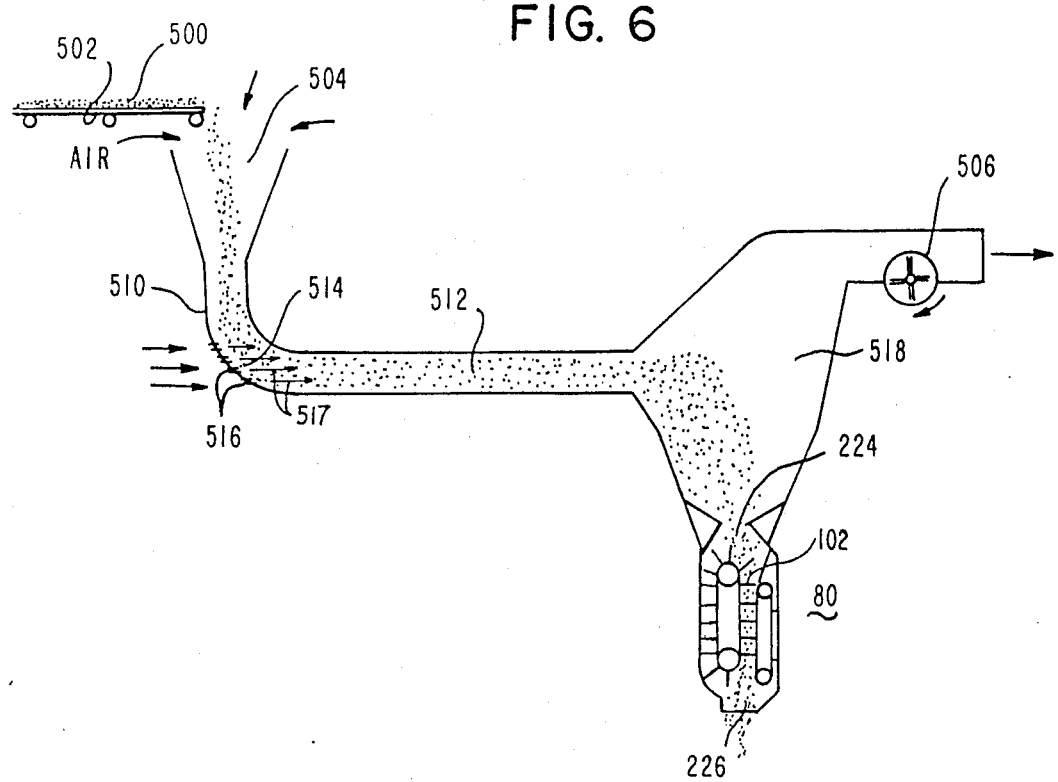
FIG. 6 is a simplified elevation in section of a transport system incorporating an airlock.

FIG. 6 illustrates a typical environment in which the present invention would be useful. Particulates, such as tobacco 500 after one stage of treatment, are dropped from a conveyor 502 into a chute 504. Chute 504 is in fluid communication with exhaust fan 506, which draws air through the system and maintains lower air pressure at the fan's intake.

Tobacco is drawn with the moving air at high velocity through ducts such as 510, 512. Where bends occur in the duct system, such as at elbow 514, vent holes 516 are provided along the outside circumference of the turn. Air jets 517 from these vent holes or nozzles prevent tobacco from hugging the outside wall of the turn due to centrifugal force. Such hugging would result in increased tobacco interaction with the wall and in resultant shread breakage.

A chamber 518 is provided at the intended point of tobacco delivery. The cross sectional area of this chamber is much larger than that of ducting 512. Thus chamber 518 serves as a large volume settling chamber. Air is drawn from the top region of chamber 518 towards fan 506, while tobacco settles to the bottom region of chamber 518.

Airlock 80 is located at the bottom of chamber 518, in fluid communication with the bottom region.

Tobacco lands on the flaps at the top of the airlock, such as flap 102, and is transported on the flap down to discharge 226 for delivery to the next processing step.

Figure 7:
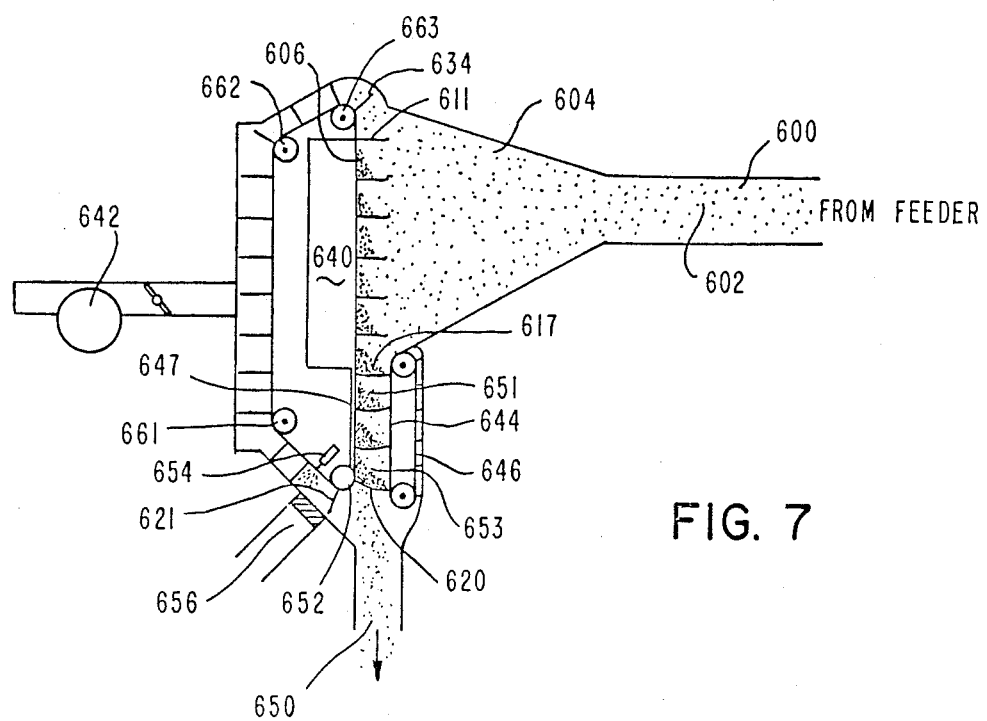
FIG. 7 is a simplified elevation in section of another embodiment of the airlock.

FIG. 7 shows another variation of the invention. Particulates, such as tobacco 600 are drawn entrained in high-velocity air through duct 602 into a conically shaped deceleration chamber 604. The far surface of chamber 604 comprises a rotating porous belt 606 with non-porous cleats or flaps 611-634 projecting perpendicularly to the belt. Behind the belt is a suction box 640 connected to exhaust blower 642.

Air from duct 602 is directed towards, and sucked through, belt 606 into box 640. The tobacco entrained in the air is sucked against porous belt 606 where it remains. Belt 606 rotates downward until the free edge of flap 617 mates with the transport surface 644 of sealing belt 646, which cooperates with belt 606, and flaps 617-620 to form transport chambers 651-653. These chambers 651-653 transport the tobacco away from the influence of suction box 640, to an area where belt 606 is backed by a back-sealing means such as a flexible, plastic sealing flap 647. Without suction on belt 606, the tobacco falls from belt 606 and rests in its transport chamber 651-653, until belt 606 rounds roller 652 and swings flap 620 rapidly out from under the tobacco to the position of flap 621. The unsupported tobacco falls through discharge 650 which delivers a relatively even supply of tobacco to a cigarette maker at a relatively surge-free rate. After belt 606 rounds roller 652, the inside surface of belt 606 is blasted by air-jet belt cleaner 654. This dislodges dust which is drawn off through duct 656. The clean porous belt 606 rotates around various rollers 661-663 back to position at flap 634.

I claim:

1. An airlock for the continuous feeding therethrough of a material, while obstructing the free flow of a gas, the airlock comprising:
   a housing;
   a first continuous belt means located within the housing, said belt means having a plurality of substantially non-porous flap means projecting outwardly from the surface of said belt means each said flap means having a free edge disposed outwardly from the surface of said first belt means;
   a second belt means located within the housing, a substantial part of said second belt means disposed in spaced substantially parallel relationship to said first belt means to sealingly engage said free edges of said flap means of said first belt means; and drive means for moving at least one of said belt means; wherein:

said first belt means passes through a nadir;

the surface of said first belt means passes along an arc within which lies the nadir; and said material being transported by said first belt means is discharged therefrom along said arc within 90° of said nadir.

2. Apparatus according to claim 1 in which each belt means passes in its travel through a plurality of zones, the zone facing the other belt means being referred to herein as the transport zone, and the zone opposite the transport zone being referred to herein as the return zone;

the housing having side-walls and the housing sidewall which faces the return zone of said first belt means having a return flap sealing means for impelling gas flow past the returning flap means.

3. Apparatus according to claim 2 in which the housing wall which faces the return zone of the second belt means includes a return sealing means for impeding gas flow past the return zone of the first sealing means.

4. Apparatus according to claim 3 having lateral edges on the belt means and flap means and comprising, in addition, lateral sealing means for impeding gas flow past the lateral edges of said belt means and said flap means.

5. Apparatus according to claim 4 in which said lateral sealing means comprise a pair of membranes biased by fluid pressure towards the lateral edges of said belt means.

6. Apparatus according to claim 5 comprising, in addition, lateral enclosing means comprising a plurality of closely spaced elongated fingers protruding out from an outer surface of a belt means near each lateral edge of each said belt means.

7. Apparatus according to claim 6 in which the first belt means is mounted on rollers which are of small diameter.

8. Apparatus for transporting particulates entrained in a flow of a gas and for delivering such particulates separated from the flow of their entraining gas, the apparatus comprising:

duct means;

blower means for providing airflow within the duct means;

deceleration chamber means communicating with the duct means;

said deceleration chamber means being bounded on one side by a first zone of a surface of a porous belt means;

said porous belt means having a plurality of non-porous flap means projecting from the outside surface of the porous belt means;

each of said flap means having a free distal edge;

the first zone of the surface of the porous belt means being backed by suction box means having ambient gas pressure lower than that of the deceleration chamber means;

the porous belt means having a second zone;

said second zone being backed by a back-sealing means;

said second zone being located in spaced parallel relationship with a second belt means;

said second belt means having means for sealing against the free distal edges of the flap means of the porous belt.

9. Apparatus according to claim 8 having:

the second belt means located in the direction of belt transport from the suction box;

a discharge located in the direction of belt transport from the second belt means.

10. Apparatus according to claim 9 having cleaning means for providing a jet blast against the inside of the porous belt means and means for recovering dust dislodged by the jet blast.

* * * * *

UNITED STATES PATENT AND TRADEMARK OFFICE
CERTIFICATE OF CORRECTION

PATENT NO. : 4,850,749
DATED : July 25, 1989
INVENTOR(S) : William R. Sweeney

It is certified that error appears in the above-identified patent and that said Letters Patent is hereby corrected as shown below:

Cover page, at [54], in the title, "IN" should be -- FOR --.

Column 4, line 3, "(closed" should be deleted;

line 4, "cell)," should be deleted.

Claim 2, column 7, lines 20-21, "impelling" should be -- impeding --.

Signed and Sealed this

Fifth Day of November, 1991

Attest:

HARRY F. MANBECK, JR.

Attesting Officer  Commissioner of Patents and Trademarks